United States Patent
Ocko et al.

(10) Patent No.: US 8,353,760 B2
(45) Date of Patent: *Jan. 15, 2013

(54) EMBEDDING OF GAMES INTO THIRD PARTY WEBSITES

(75) Inventors: Matthew Adam Ocko, Palo Alto, CA (US); Mark Jonathan Pincus, San Francisco, CA (US); Harsimran Singh, San Francisco, CA (US); Tim Terence Trampedach, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/244,919

(22) Filed: Sep. 26, 2011

(65) Prior Publication Data

US 2012/0015747 A1  Jan. 19, 2012

Related U.S. Application Data

(63) Continuation of application No. 12/778,956, filed on May 12, 2010, now Pat. No. 8,202,159.

(60) Provisional application No. 61/179,345, filed on May 18, 2009.

(51) Int. Cl.
  *A63F 9/24* (2006.01)
  *A63F 13/00* (2006.01)
  *G06F 17/00* (2006.01)
  *G06F 19/00* (2006.01)
(52) U.S. Cl. .......... 463/25; 463/31; 463/40; 463/42
(58) Field of Classification Search ............ 463/31, 463/42, 25, 40
See application file for complete search history.

(56) References Cited

U.S. PATENT DOCUMENTS

| | | | |
|---|---|---|---|
| 6,877,096 B1 * | 4/2005 | Chung et al. | 713/185 |
| 7,288,028 B2 | 10/2007 | Rodriquez et al. | |
| 2002/0013174 A1 * | 1/2002 | Murata | 463/42 |
| 2002/0022516 A1 * | 2/2002 | Forden | 463/32 |
| 2002/0155878 A1 * | 10/2002 | Lert, Jr. et al. | 463/19 |
| 2005/0096975 A1 * | 5/2005 | Moshe | 705/14 |
| 2005/0153766 A1 * | 7/2005 | Harmon | 463/9 |
| 2005/0160141 A1 * | 7/2005 | Galley et al. | 709/204 |
| 2006/0094504 A1 * | 5/2006 | Polchin | 463/36 |
| 2006/0121964 A1 * | 6/2006 | Gilligan | 463/9 |
| 2006/0184375 A1 * | 8/2006 | Stone et al. | 705/1 |
| 2007/0250573 A1 * | 10/2007 | Rothschild | 709/205 |
| 2007/0282697 A1 * | 12/2007 | Kirby | 705/26 |
| 2007/0293322 A1 * | 12/2007 | Horowitz et al. | 463/42 |
| 2008/0059304 A1 * | 3/2008 | Kimsey | 705/14 |
| 2008/0097830 A1 * | 4/2008 | Kim | 705/10 |
| 2008/0108432 A1 * | 5/2008 | Cohen et al. | 463/32 |
| 2008/0201734 A1 * | 8/2008 | Lyon et al. | 725/34 |
| 2008/0288350 A1 * | 11/2008 | Iris et al. | 705/14 |
| 2008/0311984 A1 * | 12/2008 | Mai | 463/31 |
| 2009/0005174 A1 * | 1/2009 | Joo et al. | 463/42 |

(Continued)

OTHER PUBLICATIONS

"Boost traffic by adding free game channel," Nov. 6, 2008.*

(Continued)

*Primary Examiner* — Xuan Thai
*Assistant Examiner* — Michael Grant
(74) *Attorney, Agent, or Firm* — Schwegman, Lundberg & Woessner, P.A.

(57) ABSTRACT

Systems and methods for embedding and tracking revenue from fully operational games into third party websites are disclosed.

20 Claims, 6 Drawing Sheets

U.S. PATENT DOCUMENTS

| | | | |
|---|---|---|---|
| 2009/0253517 A1* | 10/2009 | Bererton et al. | 463/42 |
| 2009/0298594 A1* | 12/2009 | Pueyo et al. | 463/42 |
| 2010/0222121 A1* | 9/2010 | Holmes et al. | 463/9 |
| 2012/0015724 A1 | 1/2012 | Ocko et al. | |

OTHER PUBLICATIONS

Roi Carthy, "Come2Play: The Ning of Social Gaming Networks," Jul. 16, 2008.*

"Come2Play Releases Game Widget Gallery," Sep. 24, 2008.*

Adam Ostrow, "Social Games Maker Playfish Raises $17M", Oct. 28, 2008.*

"Come2Play Media Kit".*

"An In-depth Look: Playfish" (http://web.archive.org/web/20090323033303/http://blog.kissmetrics.com/an-in-depth-look-playfish/) Wayback Machine, Dec. 4, 2008.*

Johnson, Chris, "How Street Fighter IV Could Make Other XBL (or PSN) games better", Player One Podcast, [Online] Retrieved from the Internet: <URL: http/www.playeronepodcast.com/2009/02/18-how-street-fighter-iv-could-make-xbl-or-psn-games-better>, (Accessed Feb. 18, 2009), 1 pg.

Sherman, Bill, "Building Social Capital: Raptr and Online Gaming Communities", Aha-Moments, [Online]. Retrieved from the Internet: <URL: http://aha-moments.com/2008/09/building-capital-raptr-and-online-gaming-community>, (Accessed Sep. 5, 2008), 5 pgs.

U.S. Appl. No. 12/778,956, filed May 12, 2010, Embedding of Games Into Third Party Websites.

U.S. Appl. No. 13/244,914, filed Sep. 26, 2011, Embedding of Games Into Third Party Websites.

U.S. Appl. No. 13/244,917, filed Sep. 26, 2011, Embedding of Games Into Third Party Websites.

"Afro-Ninja Productions—Licensing", [Online]—retrieved from the internet: <http://afro-ninja.com/licensing>, 1 pg.

* cited by examiner

EMBEDDING OF GAMES INTO THIRD PARTY WEBSITES

CLAIM OF PRIORITY

This application is a continuation of and claims the benefit of priority under 35 U.S.C. §120 to U.S. patent application Ser. No. 12/778,956, filed on May 12, 2010 now U.S. Pat. No. 8,202,159, which claims the benefit of priority under 35 U.S.C. §119(e) to U.S. Provisional Patent Application Ser. No. 61/179,345, filed on May 18, 2009, the benefit of priority of each of which is claimed hereby, and each of which are incorporated by reference herein in its entirety.

BACKGROUND

Currently, it is possible to embed various objects and elements created by content providers and developers into the websites of third party online content providers. Objects such as movies, pictures and advertisements, backed by various web analytics, can be embedded into many web pages to facilitate and promote strategic cooperation between various online services and content providers. The cooperative agreements developed by the various participating entities can be significant revenue generators when the proper model is used for charging and sharing fees for a particular embedded object.

A typical goal of embedding objects into a third party website is to drive online traffic to one or more other websites. On the side of the entity offering the object to be embedded, the goal is to draw users to another website or display advertising material for goods or services. On the side of the website in which the object is embedded, the goal is to generate advertising revenue, increase content value or co-brand content with another provider in an effort to increase online visibility. Contemporary systems that embed objects either embed a) static text links, b) linear visual content (e.g., an audio or video player) or c) at most, a simple single player games. These types of embedded objects have various levels of success that content providers and website operator try to quantify to help price their advertising space.

The effectiveness or commercial success of an object embedded in a particular website is often measured in terms of click-through rate. Click-through rate or CTR is a way of measuring the success of an embedded object or online advertising campaign. A CTR is obtained by dividing the number of users who clicked on an ad or other object embedded on a website by the number of times the ad or other embedded object was delivered (impressions). For example, if a banner ad was delivered 100 times (impressions delivered) and one person clicked on it (clicks recorded), then the resulting CTR would be 1 percent. In addition to knowing the CTR for a particular embedded object on a particular website, it is also useful to know the identity or location of users who click through for purposes of tracking online behavior. Such information can be used to target particular users or groups of users with ads and objects containing ads for goods and services they are most likely to use or purchase. However, most methods of tracking online behavior require saving a unique "cookie" on users' computers. In many cases, this requires users to log onto a particular website, which some users may be reluctant to do for security or privacy concerns. In addition, many users disable or delete cookies from their computer to hide their identity to, reduce the perceived risk associated with being online. This type of online user behavior can easily thwart the ability of an online advertiser to evaluate the effectiveness of or target an online campaign.

DETAILED DESCRIPTION OF PREFERRED EMBODIMENTS

Figure 1:
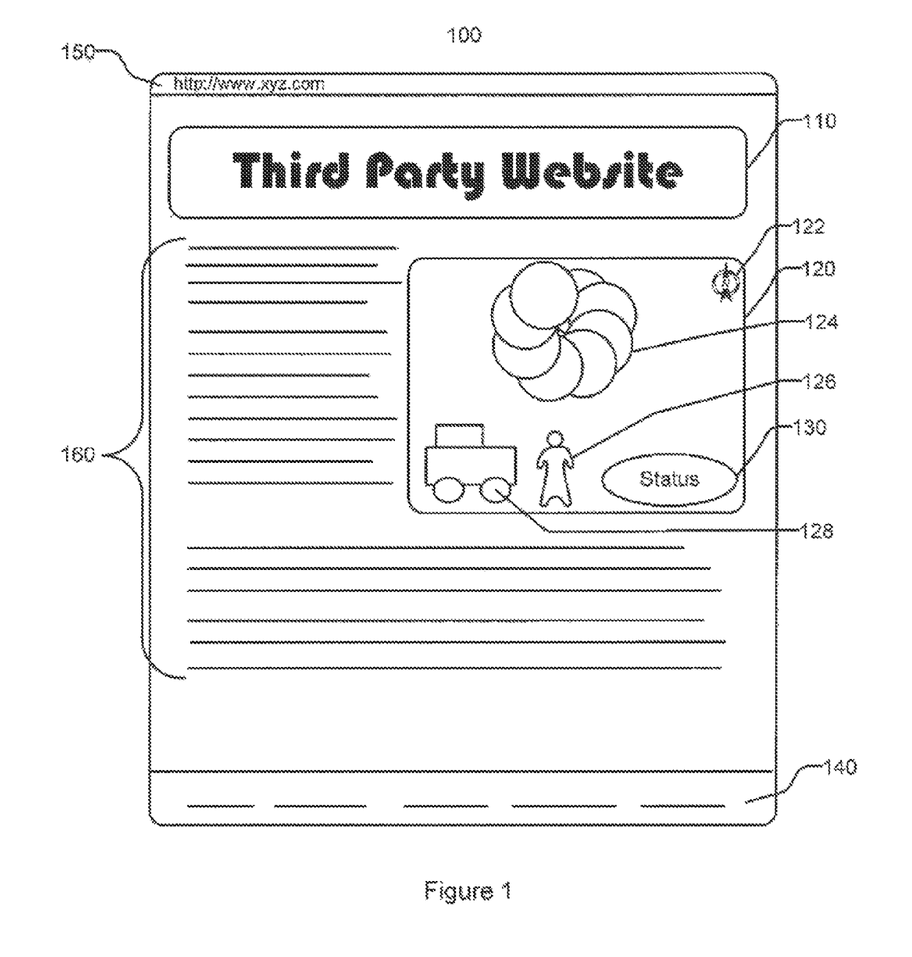
FIG. 1 illustrates a game embedded in a third party website according to one embodiment of the present invention.

FIG. 1 illustrates a webpage 100 with an embeddable fully operational game 120 according to embodiments of the present invention. Unlike other web-page embeddable revenue sharing systems, embodiments of the present invention permit the embedding of an operational, interactive, multi-player game in a web page. Embodiments of the present invention offer unique two-way revenue sharing, branding and promotion opportunities. Unlike other website embeddable revenue sharing systems, embodiments of the present invention enable website operators to purchase or barter for exposure inside an on-going gaming multi-player game or environment depicted as game 120 embedded in webpage 100 in addition to traditional click-through based revenue sharing. As shown, game 120 can be embedded into website 100 along side content 160 and banner or banner ad 110. Website 100 may also include copyright, contact and other information or hypertext links in an area 140 or other area in which such information is traditionally provided.

In various embodiments, the logo or name of the website in which the game is embedded can be displayed or co-branded on various elements 124 or on avatar or character 126. For example, a user may be a player in an "unlocked" poker game that the user entered from a particular website. When the user joins the game, the baize of the poker table can be emblazoned with the logo 110 or web address 150 for the particular website. In the example depicted in FIG. 1, "Third Party Website" logo 110 or name can be displayed anywhere in the game including, but not limited to, logo 122, element 124, character 126 or status box 130. When the user clicks on the logo, title or web address, the browser can open a second window for the particular website or take the user to another website were he can view or purchase related goods or services. Game 120 may also include one or more virtual objects 128 with which a player character of a user may interact, including purchasing or exchanging virtual objects. For example a user may purchase a virtual object 128 with virtual currency or legal tender. Virtual currency can itself be earned by in-game achievements and/or purchased by users using legal, government issued tender, such as U.S. dollars. In some forms, each unit of virtual currency may correspond to a certain amount of legal tender. Such an exchange rate can be set arbitrarily by a system operator or based on a market exchange.

Another illustrative example of the functionality of various embodiments of the present invention is a checkers game embedded in a game maker's website (or on one sponsored by the game maker). In such an embodiment, the checkers can have the logo or the name of the game maker. However, if you were to view or play the same game embedded in another website, such as Facebook.com or Zynga.com, the checker pieces can then have a Facebook or Zynga logo or name displayed on them. In alternative embodiments, the checkers, or other game elements, can have the logo or name of any product service that the website in which the game is embedded would like. For example, it would be possible for a social networking site such as Facebook or MySpace to sell advertising space on the elements of game they embed into the respective websites. In such embodiments, the elements or avatar can be labeled with the logo, name or promotion of any paying advertiser. In some embodiments, the logo, name or promotion can include a hyper link to take the user to an external website or pop-up when the clicked.

In various embodiments, an operating game can be embedded into a third party website. Although the game need be to be physically hosted on third party website, it can be hosted at such a site. The embedded game can be hosted solely on a game provider server or using a third party vendor server. In addition, it is contemplated that any combination of the functions of the present invention can be hosted on or provided from any number of distributed network resources. In such embodiments, there can be two or more entities involved in the agreement to embed the game in one or more websites. Various revenue generating schemes may be used to determine what and how information will be displayed in an embedded game and for what price. For example, one or more entities can pay the game provider and the owner of the website to display specified logos, names or web addresses displayed in a game. One advantage of various embodiments is that one game can participate in one or more revenue generating transactions. For example, the third party website or the game developer can display one or more different logos, names or web addresses, or similar graphical or textual data, as well as make different commercial offers, provide different rewards (e.g., the right to play a new level), or offer different virtual goods or transactions related thereto, based on the time of day, IP address location, type of website, demographic or other similar specific information.

Alternatively, if the game is "locked," then whenever the user plays the game, he will be presented with branding of the website through which he originally registered and entered the game regardless of the website through which he rejoins the game, or may alternatively be precluded from rejoining the game unless it is from the website which he originally entered and registered. Verification of where the user entered may be accomplished by various technical means familiar to one of ordinary skill in the art, including but not limited to cookies, IP address identification (from the referring website), and registration. In such embodiments, the entity that originally registered the user can pay the game provider or other game access sites to direct advertising to that particular user. As such, the registering entity might be paid by the game developer for signing up a player. That same registering entity might then pay another website whenever the player plays the game through the other website and is shown advertising pointing back to the registering entity. One of ordinary skill in the art will recognize that there are many variations of potential business arrangements that can be made for advertising and multi-party fee sharing without deviating from the spirit or scope of the present invention.

In various embodiments, the owner of a website can choose the type and style of the game based on the target demographic of the website. This type of customization will increase the likelihood a user will play the game and potentially click on the advertised actual or virtual product or service. In various embodiments, the website in which the game is embedded can require the user to be logged in. In such embodiments, a cookie can be saved to the user's computer, thus making it possible to track the user's online behavior and click-through habits and further direct advertisements to the user. In other embodiments, cookies are not necessary since the user has significant incentive to self identify because not doing so would preclude the user from playing the game.

Figure 2:
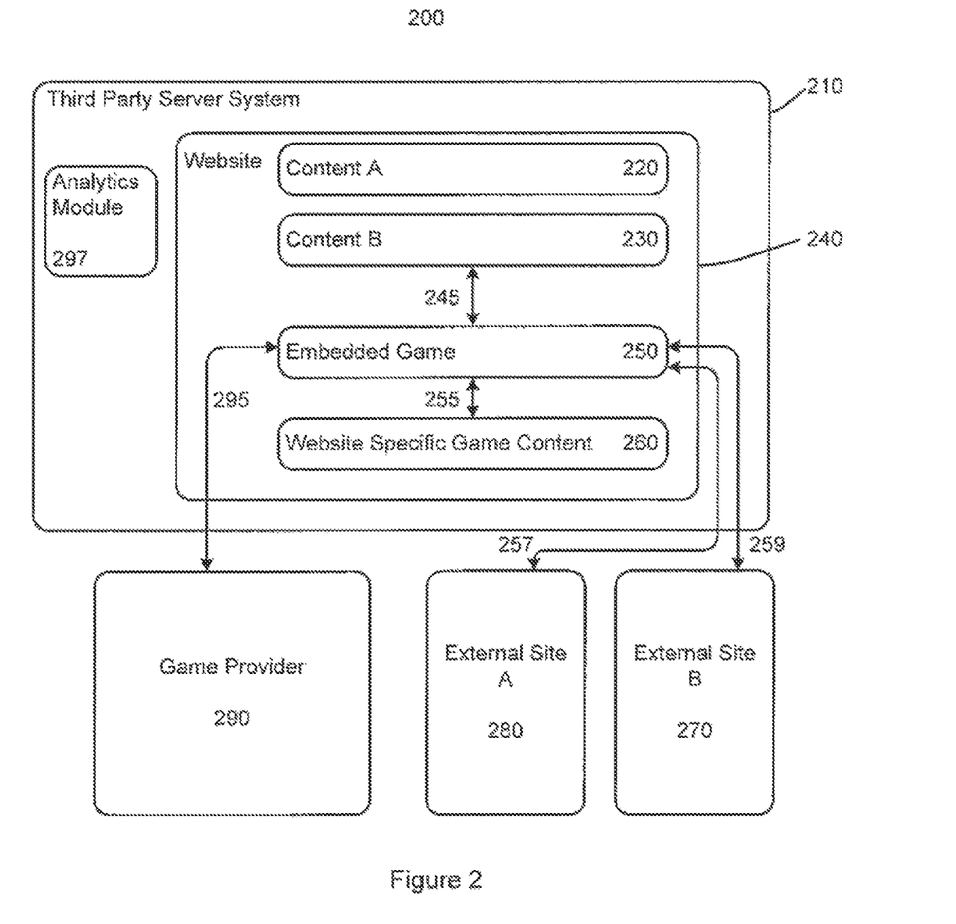
FIG. 2 depicts a block diagram of a system to embed a game into a third-party website according to one embodiment of the present invention.

FIG. 2 depicts a block diagram of system 200 for embedding a fully functional game into a third-party website. As shown in FIG. 2, third-party server system 210 includes a website 240 and optionally an analytics module 297. In some embodiments, website 240 can include various pieces of content. As used herein, content can refer to text, music, movies, pictures or any other media capable of being delivered via a website. Website 240 includes content A 220 and content B 230. In various embodiments, website 240 can also include an embedded game 250 and website specific game content 260. Game 250 can be linked via connection 245 to content B 230 to import or share information. The information shared between embedded game and the content on websites 240 can include logos, names, color schemes and other branding characteristics of website 240. In such embodiments, embedded game 250 can be customized to not only display the name and logo of the entity that owns the third-party server system or website, but can also include color, font and other stylistic information so that the embedded game 250 is consistent with the look and feel of website 240.

In various other embodiments, website 240 can also include website specific game content 260. In such embodiments website specific game content 260 can be linked to the embedded game 250 via connection 255. Over connection 255, website specific content 260 can be included in embedded game 250. For example, embedded game 250 can include stylized characters or elements to fit the look and feel of website 240.

In various embodiments, embedded game 250 can be run on and delivered remotely from game provider 290. In such embodiments, game provider 290 can provide website 240 with code or a link that will run embedded game 250 over connection 295. In some embodiments, connection 295 can be implemented over the Internet. In various other embodiments, embedded game 250 can incorporate content from or links to external sites such as external site A 280 and external site B 270 over connections 259 and 257 respectively. Such connections allow the owner of website 240 to sell advertising space or actual or virtual goods in the embedded game 250 to external site A 280 and external site B 270 through the agency of the game provider, including through such facilities as the game provider's ad network. In such embodiments, external site A 280 and external site B 270 can pay the owner of website 240 to place images of their products, logos or other branding information into embedded game 250. In other embodiments, embedded game 250 can provide links that users can follow by clicking on elements in embedded game 250 to either navigate to, produce a pop-up displaying the website of external site A 280 or external site B 270, or to undertake actions in the game at the direction of those external sites.

In various other embodiments, third-party server system 210 can receive information from analytics module 297, which can be controlled by the game provider but may be distributed and/or cooperative in nature across the game provider and third party server system. Analytics module 297 can include logic to analyze the effectiveness of embedded game

250. In such embodiments, analytics module 297 can analyze the effectiveness and compute the CTR and purchase of actual or virtual goods for various combinations of content embedded into embedded game 250. Such analysis can include examination of the style and type of game embedded as well as traditional web analytics such as color, placement and size. The analytics module can also include analysis of other game and user information such as which users bought what actual or virtual goods, who undertook what actions in the game, when, how did this correlate to virtual goods purchases, how many friends were involved, how long did they stay per session, etc. The style and type of game can include reference to whether the user is required to be logged into the website 240 or the embedded game 250.

Figure 3:
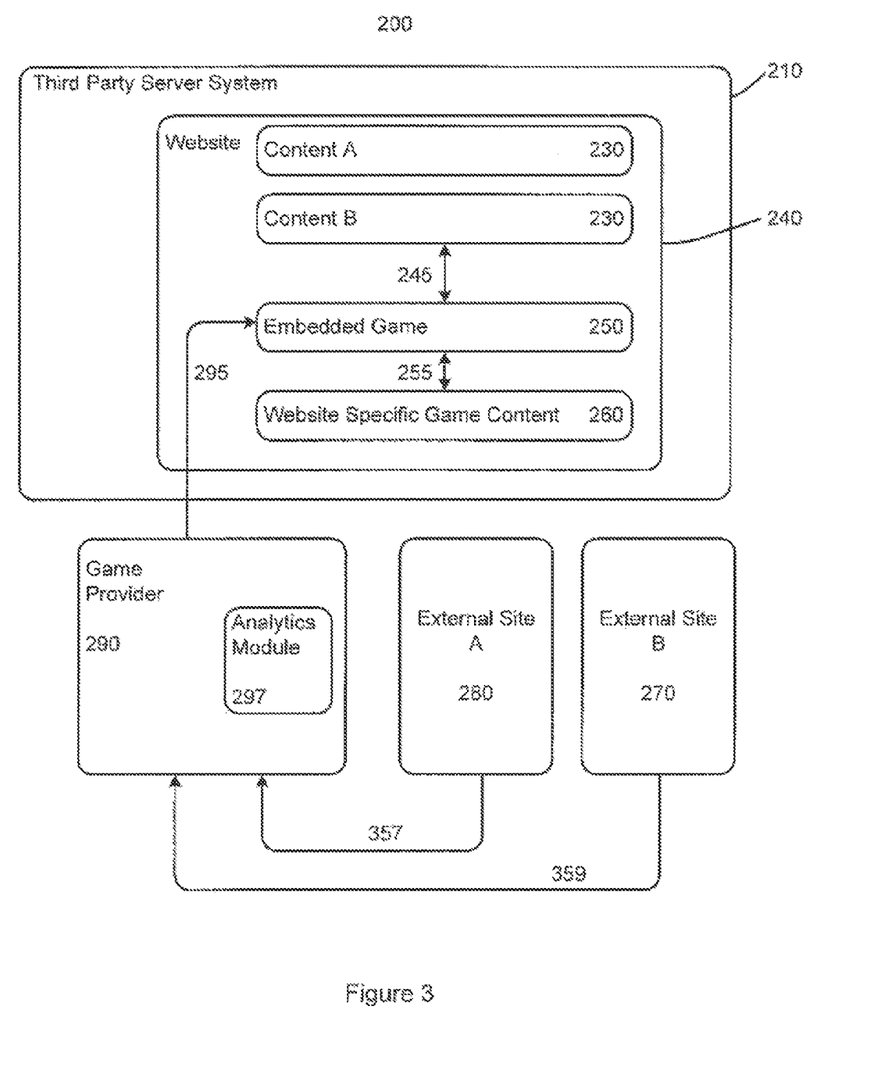
FIG. 3 depicts a block diagram of a system to embed a game into a third-party website according to one embodiment of the present invention.
Figure 4:
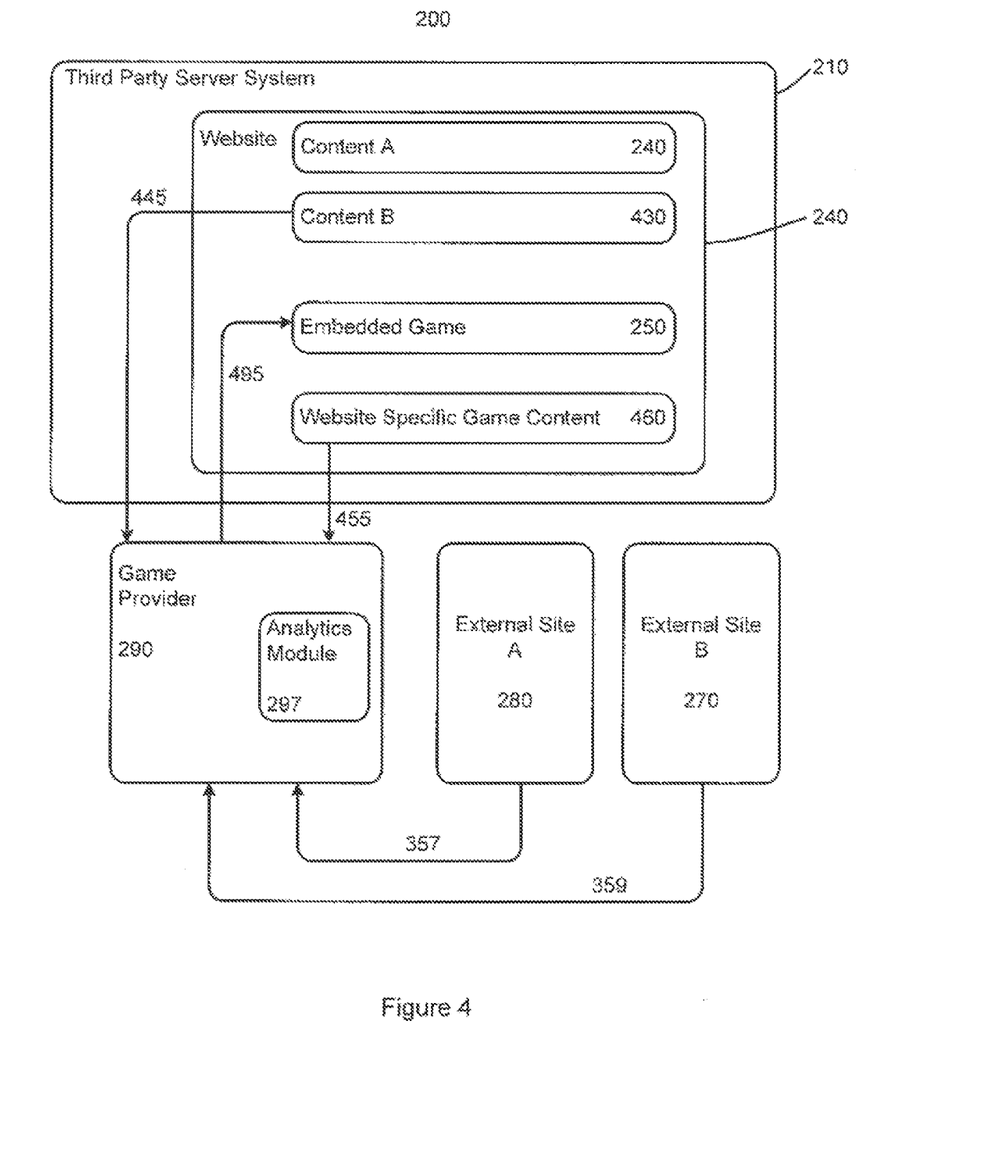
FIG. 4 depicts a block diagram of a system to embed a game into a third-party website according to one embodiment of the present invention.

A variety of system architectures are possible. As FIG. 3 illustrates, game provider 290 can host analytics module 297. In the example configuration of FIG. 3, external sites 270, 280 can also provide content as well as usage data to game provider via connections 357, 359. In addition, as FIG. 4 illustrates, game provider 290 may also receive content 430 (via connection 445) and website specific game content 460 (via connection 455) from third party server system 210 for incorporation into the embedded game.

The game can require the user to be logged into the game or the website in which the embedded game is located to give the user incentive to be logged in and not block or delete cookies stored to his computer. This is an advantage of various embodiments of the present invention. When a user has incentive to be or remain logged in, that user's online behavior can be tracked more effectively. The more effectively the online behavior of a user can be tracked, the more effectively that user can be targeted with strategic advertising, and as a consequence, the advertising space in the fully operational embedded game is more valuable.

The game operator and the website operator have many options when selecting the revenue sharing mechanism between them. For example, a traditional pay-per-click-through scheme can be used in which an external site will pay the operator of the website in which an embedded game is located a fee for each successful click-through on an ad or incentive in a frame around the game or in the game itself. In other examples, the game provider can be the entity providing the potential click-through opportunity to a user and will share whatever revenue it generates with the operator of the website in which the embedded game is located. One of ordinary skill in the art will recognize that there are many revenue-sharing schemes that can be used without deviating from the spirit or scope of the present invention.

In various other embodiments, the embedded game or the website in which it is embedded, can track and calculate compensation for all, revenue generating activity, such as purchases resulting from click-thrus from the embedded game. This can mean that the game provider can direct the revenue sharing server infrastructure, although it may be physically distributed between the game provider and a website operator's servers. In some embodiments, the game provider or a website operator can track and calculate compensation for all revenue generating sale such as sales of virtual goods including, but not limited to, purchases of in-game benefits—extra health, level status, playing rights, features or tools, in-game virtual currency, etc.

In other embodiments, either the third-party server system 210, game provider 290 or a system under the control of the game provider 290 but distributed across 210 and 290 can be adapted to manage user identities and participation across many embedded game entry points which can include game provider websites and social networking sites.

As previously mentioned, a website operator can "lock" users into a "hosted" game on their website or on particular web page so that a registered user can only play the embedded game by logging into a particular website even though the game may be offered elsewhere. In such embodiments, this allows the website operator to lock in their users as a guaranteed advertising and virtual good purchase base. This can also allow the website operator to track the identity and type of users to which it will advertise or offer virtual goods. Such information can be useful in selling advertising or negotiating revenue sharing and brand promotion mechanisms.

In other embodiments, revenue sharing and player identity and status, including, but not limited, to virtual possessions, social network affiliations, and a variety of rights and privileges, can be persistent across the third party website, game operators or provider's website, and all other possible "entry points" into a given game by a given player. In such embodiments, directory and other location mechanisms are ubiquitously provided for players to look up or locate other players, and to navigate to games containing those players, regardless of where those games may be hosted (e.g., the game provider's primary website) or embedded (any one or more of third party web sites).

In various embodiments, tools and user interfaces are also provided for ensuring the privacy and control by the player of their social interactions. In these embodiments, players may be rewarded with virtual or actual goods, or other incentives, in order to disclose more information to the web site operator, the game provider or other third parties.

In some embodiments, operators of the embedded games can share revenue from visitors to those web pages who elect to enter into the embedded game. In such embodiments, revenue can be generated in a variety of fashions, including, but not limited to, purchase of a subscription to the game, purchase of virtual goods within the game (e.g., virtual decorations for a virtual house), purchase of increased status within the game (e.g., a higher skill ranking, allowing immediate competition with more seasoned players and/or more challenging game experiences), purchase of rights within the game (e.g., the right to operate by a given player a poker table, or blackjack table, for other players, in exchange for a "house cut", or percentage of the virtual gaming revenue of the players participating in games at such a table; or the right to develop certain virtual properties and sell them to other players), payments for advertising displayed to a player (display ads), payments made when an ad (which itself may be a game object, such as a virtual beverage can, or embedded within a game object, such as an image on a virtual television inside a virtual house) is clicked on or otherwise selected by the player ("cost per click", or CPC, revenue), payments made when an ad, as described above, is clicked on, or otherwise selected by the player, and the player proceeds to undertake a certain action (e.g., filling out an insurance questionnaire) with the advertiser or its affiliates or intermediaries ("cost per action", or CPA, revenue).

The operator of the game can also choose to incent the owner/operator of the third party website embedding the game in exchange for each player that enters the game through the website, as well as for subsequent behavior by that player (e.g., length of play, number of friends invited by that player, and so forth), as well as providing incentives that increase in proportion to the number of players that enter in aggregate through the third party website.

Additionally, embodiments of the present invention can provide a social mechanism for (and associated social-centric tools for inducing) participation by visitors to a website. For example, the system for embedding a game into a third-party website according to various embodiments of the present invention, can identify (by asking for an email address, or social network ID, or even by analyzing IP address) whether a player already has friends playing in a particular embedded game, and intent the particular player to join the game or undertake other beneficial actions. The social, multiplayer nature of the embedded game also enables the operator of the website, using the system for embedding a game into a third-party website, can provide tools to make clear to visitors that other visitors to the website (e.g., fellow readers/commenter on a blog) are playing the game, and that the as of yet uncommitted visitors should join up (e.g., sign up to a poker table or other multi-player game).

Other embodiments of the present invention offer website operators a chance to control their own social gaming revenue opportunity. For example, the system for embedding a game into a third-party website can provide a user interface and process by which the operator may select any one of thousands of on-going games (e.g., any one of thousands of poker games or role playing games in process) or select a unique window into thousands of on-going games which are immersive (e.g., a particular virtual property in a virtual world). Additionally, the system for embedding a game into a third-party website can provide website operators a chance to define their own unique game experience for the website visitors. For example, a website operator using the system to embed a game into a website can host their own poker game, or other relevant type of game, unique to their website, or even unique to a single web page. Each page of a website of an operator using the system might embed a "window" into a unique property into a virtual world. In such embodiments, website operators can derive revenue in cooperation with the game provider in multiple ways from a single embedded game, for example selling advertising to many different advertisers through the game provider's facilities, or directly, if permitted by the game provider. Users would then have the opportunity to click on any one of the embedded windows thus providing greater potential for click-through revenue and virtual good sales, etc.

Embodiments of the present invention can focus on payments for the addition of, and/or the actions of (e.g., virtual goods purchases) by users in an on-going gaming experience, and on payments for invitations or other social metrics. Unlike other systems that display static or linear visual advertising content and wait for a click, embodiments of the present invention are capable of tracking the on-going behavior of a user in a dynamic gaming experience and assessing compensation for the users' behavior. When user behavior is tracked and compensated for in traditional systems, it is through cookies or other intrusive mechanisms which ultimately fail to operate effectively across multiple sites without explicit cooperation between back-end software between those sites. Traditional systems of embedding objects include no context. However, embodiments of the present invention can track the online behavior of users not only in reference to how they click and navigate but also in a highly granular sense relative to game play (e.g., "Bob just achieved level 13 after 2 hours of game play where he repeated the following actions that appeared to be pleasurable to him.", a social sense (e.g., "Bob just invited three more people to play poker") or in a virtual goods sense (e.g., "Bob bought a can of a virtual beverage", "Bob gave a virtual sandwich: to a friend at the gaming table").

In various embodiments, web-page embedded revenue sharing systems can persists natively even when a user navigates away from a web page. If a user denies the insertion of a cookie into, or deletes a cookie from, their browser cache, there is no way a back-end revenue sharing system can track the user short of intrusive IP address analysis, which is often inaccurate or requires third party software which runs persistently in the user's browser or operating system. For example, if you watch an embedded YouTube video on Tim's blog, and then visit. YouTube to watch the same video again, YouTube might use a cookie inserted into your browser cache by the embedded viewer on Tim's blog to reward Tim for your visit to the YouTube primary site. However, if the cookies are refused, altered or deleted by the user, then both Tim and YouTube are not rewarded. A user/player, upon visiting game operator website, or a social network which links to games, is self identifying in order to get back into the game, and consequently systems according to embodiments of the present invention can compensate the operator of the website where the player originally joined the game in progress without cookies. Embodiments of the present invention can also provide the website operator, if they share a specified amount of their revenue with the game operator, to "lock" their users from entering via any other site the game that the operator "hosts."

Systems and Methods

It should be understood that embodiments of the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

In various example embodiments, one or more described web pages and functionality discussed above may be associated with a network gaming system or network gaming service. In one implementation, a fully operational game can be implemented using FLASH®-based technologies. For example, the game can be fully or partially implemented as a SWF object that is embedded in a web page and executable by a Flash® media player plug-in.

Figure 5:
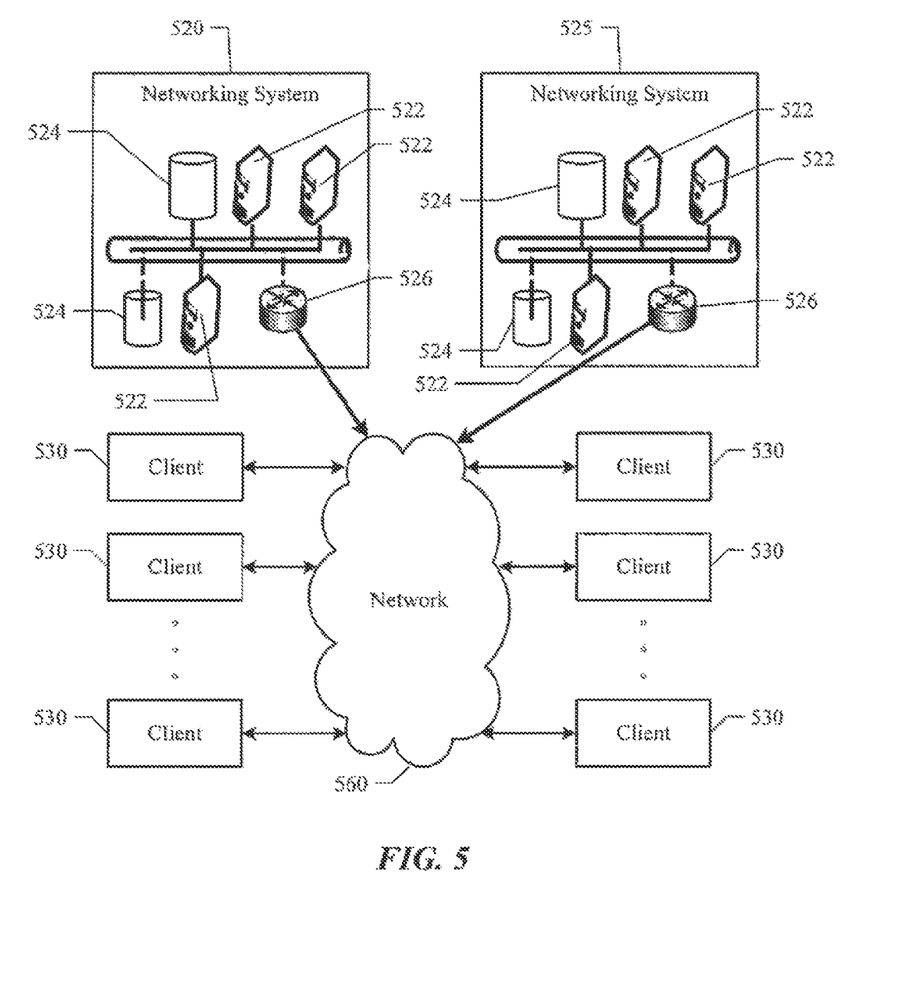
FIG. 5 illustrates an example network environment.

Particular embodiments may operate in a wide area network environment, such as the Internet, including multiple network addressable systems. FIG. 5 illustrates an example network environment, in which various example embodiments may operate. Network cloud 560 generally represents one or more interconnected networks, over which the systems and hosts described herein can communicate. Network cloud 560 may include packet-based wide area networks (such as the Internet), private networks, wireless networks, satellite networks, cellular networks, paging networks, and the like. As FIG. 5 illustrates, particular embodiments may operate in a network environment comprising one or more network gaming systems 520, one or more web sites 525, and one or more client devices 530. Client devices 530 associated with individual users are operably connected to the network environment via a network service provider, a wireless carrier, or any other suitable means.

Network gaming system 520 is a network addressable system that, in various example embodiments, comprises one or more physical servers 522 and data store 524. The one or more physical servers 522 are operably connected to computer network 560 via, by way of example, a set of routers and/or networking switches 526. In an example embodiment, the functionality hosted by the one or more physical servers 522 may include web or HTTP servers, FTP servers, as well as, without limitation, web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (MAX), Flash, ActionScript, and the like.

Physical servers 522 may host functionality directed to the operations of network gaming system 520. Hereinafter servers 522 may be referred to as server 522, although server 522 may include numerous servers hosting, for example, network gaming system 520, as well as other content distribution servers, data stores, and databases. Data store 524 may store content and data relating to, and enabling, operation of the network gaming system 520 as digital data objects. A data object, in particular implementations, is an item of digital information typically stored or embodied in a data file, database or record. Content objects may take many forms, including: text (e.g., ASCII, SGML, HTML), images (e.g., jpeg, tif and gin, graphics (vector-based or bitmap), audio, video (e.g., mpeg), or other multimedia, and combinations thereof. Content object data may also include executable code objects (e.g., games executable within a browser window or frame), podcasts, etc. Logically, data store 524 corresponds to one or more of a variety of separate and integrated databases, such as relational databases and object-oriented databases, that maintain information as an integrated collection of logically related records or files stored on one or more physical systems. Structurally, data store 524 may generally include one or more of a large class of data storage and management systems. In particular embodiments, data store 524 may be implemented by any suitable physical system(s) including components, such as one or more database servers, mass storage media, media library systems, storage area networks, data storage clouds, and the like. In one example embodiment, data store 524 includes one or more servers, databases (e.g., MySQL), and/or data warehouses. Data store 524 may include data associated with different network gaming system 520 users and/or client devices 530.

Client device 530 is generally a computer or computing device including functionality for communicating (e.g., remotely) over a computer network. Client device 530 may be a desktop computer, laptop computer, personal digital assistant (PDA), in- or out-of-car navigation system, smart phone or other cellular or mobile phone, or mobile gaming device, among other suitable computing devices. Client device 530 may execute one or more client applications, such as a web browser (e.g., Microsoft Internet Explorer, Mozilla Firefox, Apple Safari, Google Chrome, and Opera, etc.) and plug-ins and/or other extensions (e.g., Flash® Media Player), to access content over a computer network. In other implementations, client device 530 may host a special-purpose client application that is specifically adapted to access network gaming system 520 in order to access a network game, such as a virtual poker game.

Figure 6:
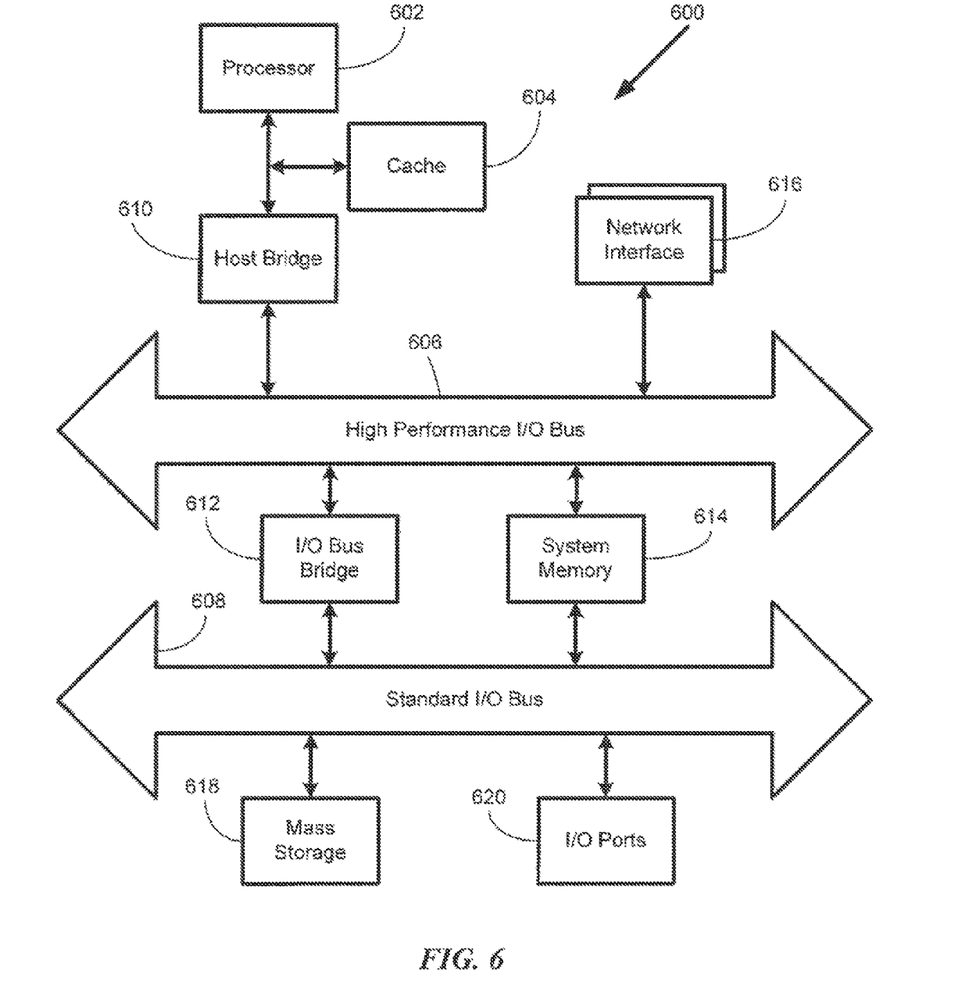
FIG. 6 illustrates an example computer system architecture.

FIG. 6 illustrates an example computing system architecture, which may be used to implement a server 522 or a client device 530. In one embodiment, hardware system 600 comprises a processor 602, a cache memory 604, and one or more executable modules and drivers, stored on a tangible computer readable medium, directed to the functions described herein. Additionally, hardware system 600 may include a high performance input/output (I/O) bus 606 and a standard I/O bus 608. A host bridge 610 may couple processor 602 to high performance I/O bus 606, whereas I/O bus bridge 612 couples the two buses 606 and 608 to each other. A system memory 614 and one or more network/communication interfaces 616 couple to bus 606. Hardware system 600 may further include video memory (not shown) and a display device coupled to the video memory. Mass storage 618, and I/O ports 620 couple to bus 608. Hardware system 600 may optionally include a keyboard and pointing device, and a display device (not shown) coupled to bus 608. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 600 are described in greater detail below. In particular, network interface 616 provides communication between hardware system 600 and any of a wide range of networks, such as an Ethernet (e.g., IEEE 802.3) network, a backplane, etc. Mass storage 618 provides permanent storage for the data and programming instructions to perform the above-described functions implemented in servers 522, whereas system memory 614 (e.g., DRAM) provides temporary storage for the data and programming instructions when executed by processor 602. I/O ports 620 are one or more serial and/or parallel communication ports that provide communication between additional peripheral devices, which may be coupled to hardware system 600.

Hardware system 600 may include a variety of system architectures; and various components of hardware system 600 may be rearranged. For example, cache 604 may be on-chip with processor 602. Alternatively, cache 604 and processor 602 may be packed together as a "processor module," with processor 602 being referred to as the "processor core." Furthermore, certain embodiments of the present disclosure may not require nor include all of the above components. For example, the peripheral devices shown coupled to standard I/O bus 608 may couple to high performance I/O bus 606. In addition, in some embodiments, only a single bus may exist, with the components of hardware system 600 being coupled to the single bus. Furthermore, hardware system 600 may include additional components, such as additional processors, storage devices, or memories.

An operating system manages and controls the operation of hardware system 600, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other implementations are possible. For example, the functions described herein may be implemented in firmware or on an application specific integrated circuit.

Furthermore, the above-described elements and operations can be comprised of instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions are operational when executed by the processing system to direct the processing system to operate in accord with the invention. The term "processing system" refers to a single processing device or a group of inter-operational processing devices. Some examples of processing devices are integrated circuits and logic circuitry. Those skilled in the art are familiar with instructions, computers, and storage media.

Miscellaneous

One or more features from any embodiment may be combined with one or more features of any other embodiment without departing from the scope of the disclosure.

A recitation of "a", "an," or "the" is intended to mean "one or more" unless specifically indicated to the contrary.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the processes described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, personal digital assistance, personal gaming device, etc.), that makes API calls directly to a server. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A method comprising:
providing, by a game provider system of a game provider, an interface to an operator of a website that is distinct from the game provider;
receiving, from the operator, a selection of a game to be embedded into the website of the operator;
providing the game for embedding into the website of the operator;
calculating, using a processor of a machine, compensation for the operator of the website based on a monetization event associated with the game, the monetization event including an event caused by an action performed by a user during a game session that is accessed via a different website from that of the website of the operator through which the user initially registered for the game; and
allocating the compensation to the operator of the website.

2. The method of claim 1 wherein the game is a persistent game.

3. The method of claim 1, further comprising:
associating, at the game provider system, the user of the game with the website through which the user initially registered for the game; and
tracking the monetization event during a game session after the user initially entered the game, the monetization event being associated with an action performed by the user via an advertisement provided within the game.

4. The method of claim 3, wherein the action performed by the user comprises a purchase of an item.

5. The method of claim 3, wherein the action performed by the user is a click-through via the advertisement provided within the game.

6. The method of claim 1, wherein monetization event comprises registering the user for the game by the operator.

7. The method of claim 1, wherein the compensation increases in proportion to a number of new users the operator registers through the website.

8. The method of claim 1, wherein the providing the interface comprises providing the operator with an ability to choose a type and style of the game.

9. The method of claim 1, wherein the providing of the interface comprises providing a list of games from which the operator selects the game that is embedded into the website.

10. The method of claim 1, wherein the providing of the game comprises providing a code or link that runs the game.

11. The method of claim 1, further comprising allowing the operator to sell advertising space in the game.

12. The method of claim 11, wherein the advertising space is sold through an agency of the game provider system.

13. The method of claim 1, further comprising allowing an advertisement to he embedded into the game, the advertisement being associated with the monetization event.

14. The method of claim 13, wherein the advertisement comprises a hyperlink element operative to cause a navigation to an external web site.

15. The method of claim 13, further comprising receiving revenue from an external site providing the advertisement, the allocating of the compensation comprising allocating a portion of the received revenue to the operator of the website.

16. A non-transitory machine readable medium storing instructions that, when executed by at least one processor of a machine, cause the machine to perform operations comprising:
providing, by a game provider system of a game provider, an interface to an operator of a website that is distinct from the game provider;
receiving, from the operator, a selection of a game to be embedded into the website of the operator;
providing the game for embedding into the website of the operator;
calculating compensation for the operator of the website based on a monetization event associated with the game, the monetization event including an event caused by an action performed by a user during a game session that is accessed via a different website from that of the website of the operator through which the user initially registered for the game; and allocating the compensation to the operator of the website.

17. The non-transitory machine readable medium of claim 16, wherein the operations further comprise:

associating, at the game provider system, the user of the game with the website through which the user initially registered for the game; and tracking the monetization event during a game session after the user initially entered the game, the monetization event being associated with an action performed by the user via an advertisement provided within the game.

18. The non-transitory machine readable medium of claim 16, wherein the monetization event comprises registering the user for the game by the operator.

19. The non-transitory machine readable medium of claim 16, wherein the operations further comprise allowing an advertisement to be embedded into the game, the advertisement being associated with the monetization event.

20. A system comprising:

at least one processor of a machine; and a game provider system of a game provider configured to:

provide an interface to an operator of a website that is distinct from the game provider;

receive, from the operator, a selection of a game to be embedded into the website of the operator;

provide the game tier embedding into the website of the operator;

calculate compensation for the operator of the website based on a monetization event associated with the game, the monetization event including an event caused by an action performed by a user during a game session that is accessed via a different website from that of the website of the operator through which the user initially registered for the game; and allocate the compensation to the operator of the website.

* * * * *

UNITED STATES PATENT AND TRADEMARK OFFICE
CERTIFICATE OF CORRECTION

PATENT NO. : 8,353,760 B2  
APPLICATION NO. : 13/244919  
DATED : January 15, 2013  
INVENTOR(S) : Ocko et al.

Page 1 of 1

It is certified that error appears in the above-identified patent and that said Letters Patent is hereby corrected as shown below:

In the Claims

In column 12, line 12, in Claim 2, delete "1" and insert --1,--, therefor

In column 12, line 27, in Claim 6, delete "wherein" and insert --wherein the--, therefor In column 12, line 45, in Claim 13, delete "he" and insert --be--, therefor In column 12, line 49, in Claim 14, delete "web sites" and insert --websites--, therefor In column 14, line 8, in Claim 20, delete "tier" and insert --for--, therefor Signed and Sealed this  
Twenty-eighth Day of October, 2014

Michelle K. Lee  
*Deputy Director of the United States Patent and Trademark Office*